United States Patent [19]

Kondo et al.

[11] Patent Number: 5,034,111
[45] Date of Patent: Jul. 23, 1991

[54] COMPRESSIVE AND ELECTRO-OSMOTIC DEHYDRATOR

[75] Inventors: Shiro Kondo, Miki; Takeshi Suwa, Takarazuka; Shigeru Sano, Ikoma; Osamu Muroi, Kobe, all of Japan

[73] Assignee: Shinko Pantec Co., Ltd., Kobe, Japan

[21] Appl. No.: 457,379

[22] Filed: Dec. 27, 1989

[30] Foreign Application Priority Data

Dec. 28, 1988 [JP] Japan ................. 63-169368
Dec. 28, 1988 [JP] Japan ................. 63-169369

[51] Int. Cl.$^5$ ............................................. B03C 5/00
[52] U.S. Cl. .......................... 204/300 R; 204/182.2; 204/299 R; 204/299 EC; 204/300 EC; 204/301
[58] Field of Search ............ 204/180.1, 182.2, 183.1, 204/299 R, 299 EC, 300 R, 300 EC, 301

[56] References Cited

U.S. PATENT DOCUMENTS 3,773,640  11/1973  Burrage et al. ................. 204/301
4,376,022   3/1983  Porta et al. .................. 204/300 R

FOREIGN PATENT DOCUMENTS 62-57622    3/1987  Japan .
62-57623    3/1987  Japan .
62-25811    6/1987  Japan .
62-125810   6/1987  Japan .
62-125812   6/1987  Japan .

Primary Examiner—T. Tung
Assistant Examiner—David G. Ryser
Attorney, Agent, or Firm—Marshall, O'Toole, Gerstein, Murray & Bicknell

[57] ABSTRACT

A dehydrator comprising a filter press including a pair of first and second, electrically insulating press plates supported in parallel on a frame and adapted to be moved relative to each other. Each of the press plates has a wide recess, the recesses forming a closed space between them when they engage. A pair of filter cloths for enclosing feed liquid are provided between the plates. An electricaly insulating diaphragm is fixed at its margin to the first press plate, covers the associated recess, and is adapted to swell outwardly with compressed fluid collected between the diaphragm and the first plate. A metal core plate is embedded within the diaphragm to reinforce it except for its marginal portion, and the core plate is connected to one of the positive and negative poles of an electric DC power source. Electric conductors are fixed in electric connection to the core plate, and project outwardly through the diaphragm. Divided flush carbon electrode plates are fixed in electric connection to the conductors over the diaphragm and core plate. Another electrode plate is supported in the recess of the second press plate in parallel with the divided electrode plates, and connected to the other electric pole.

7 Claims, 4 Drawing Sheets

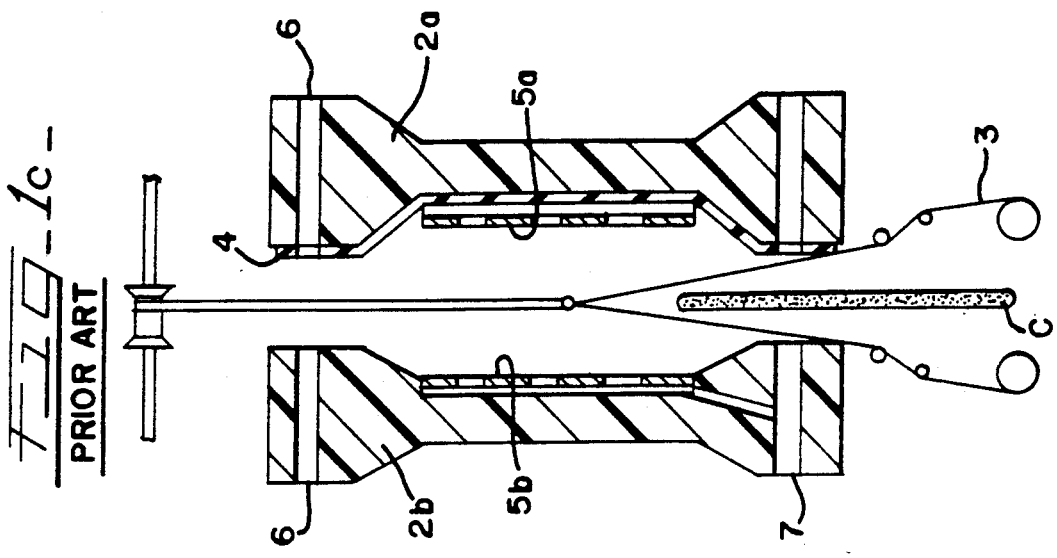
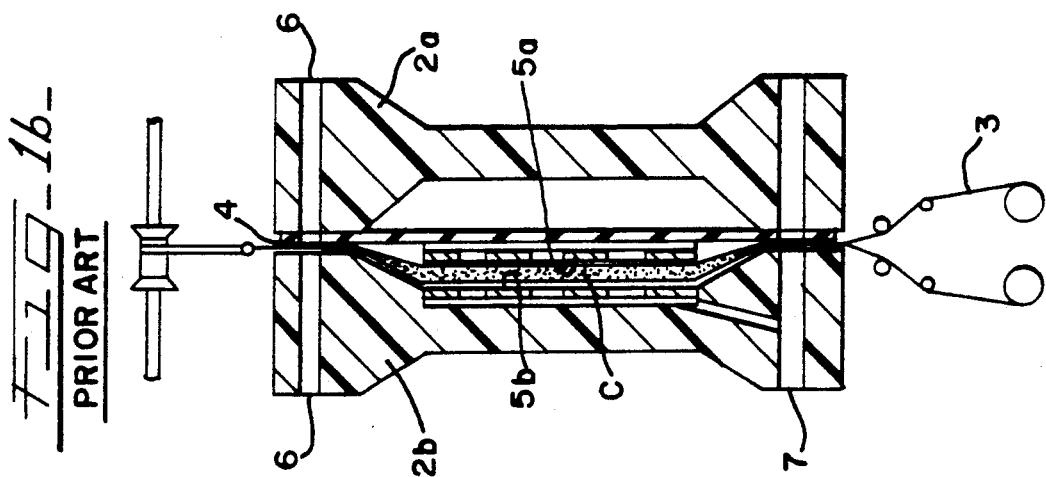
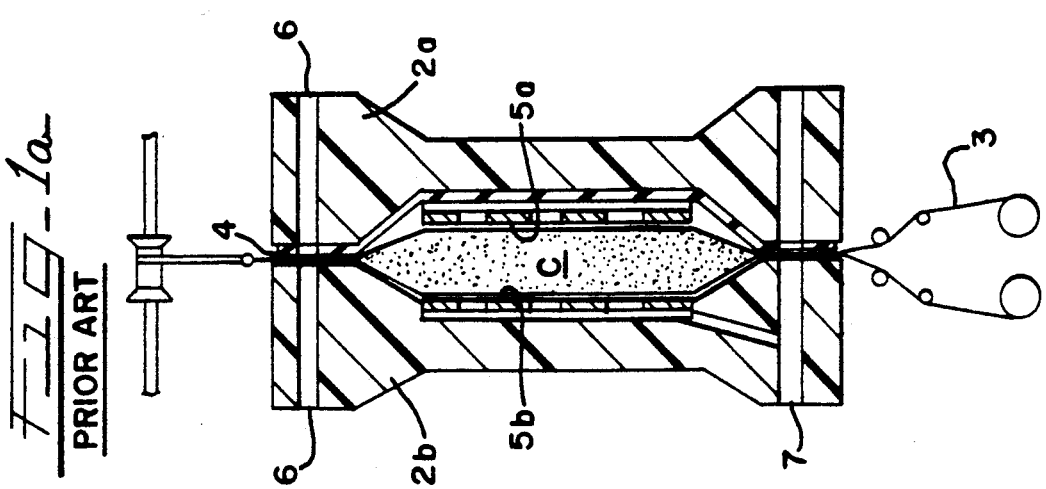

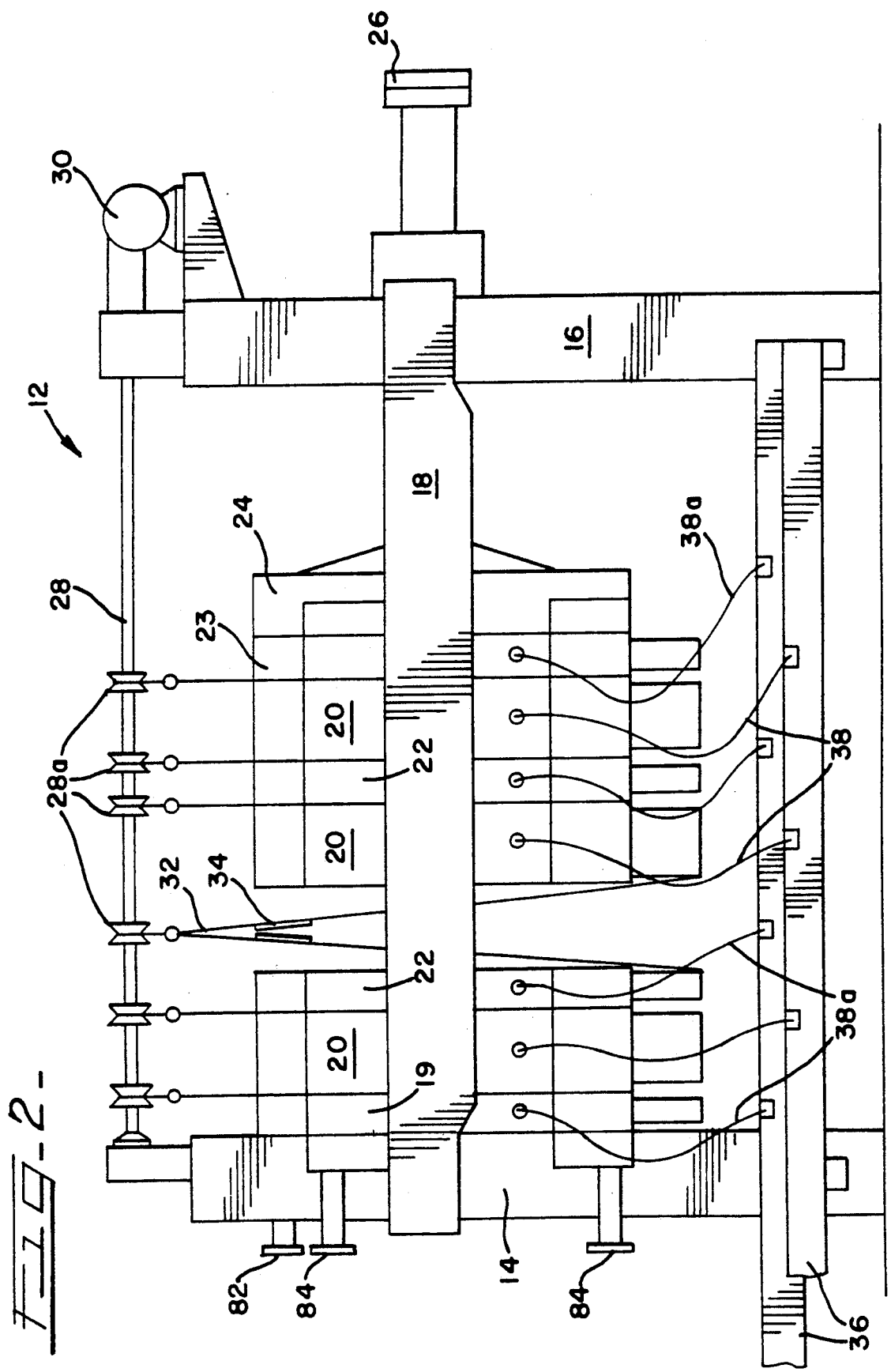

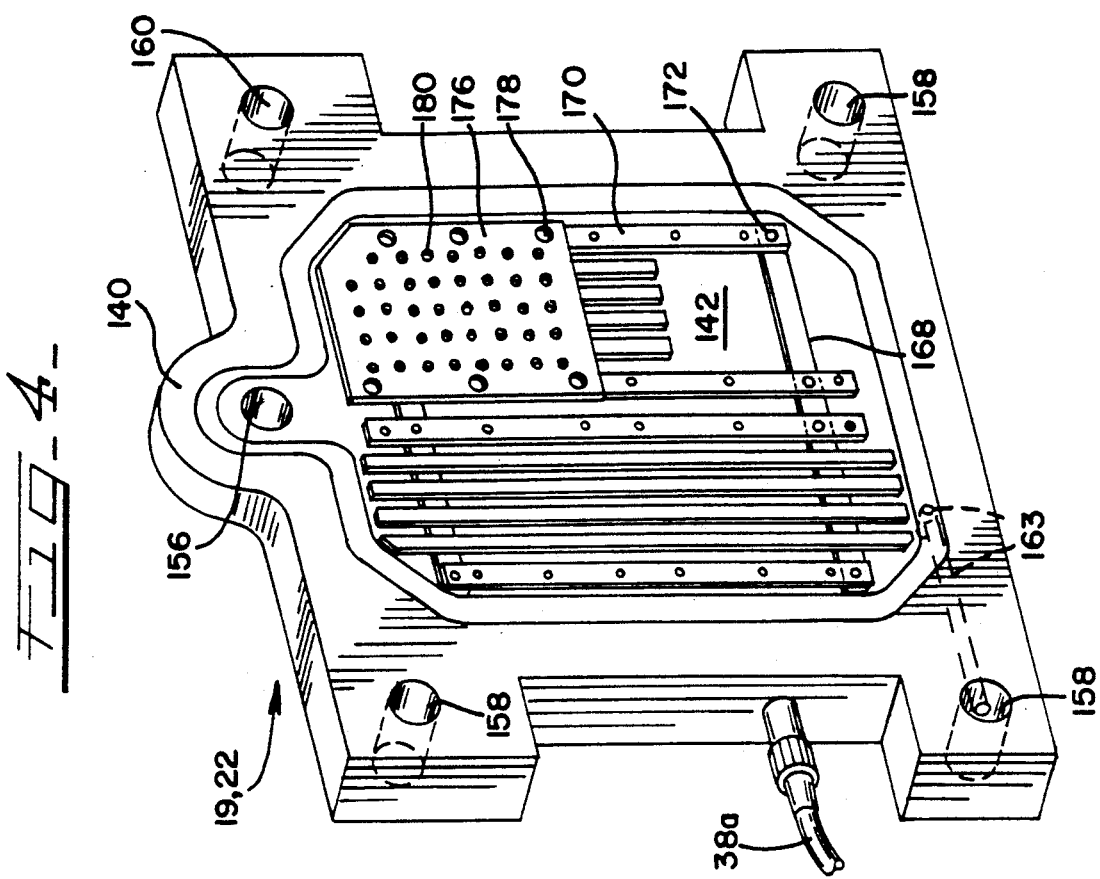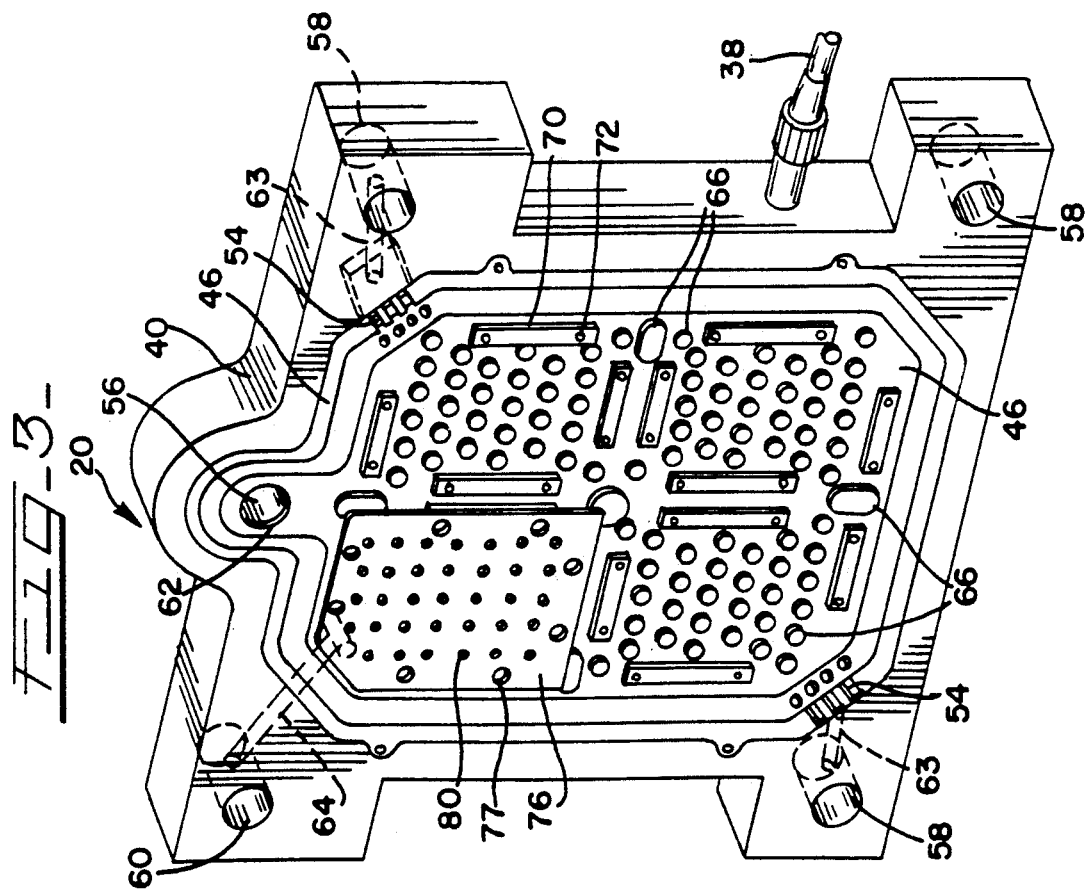

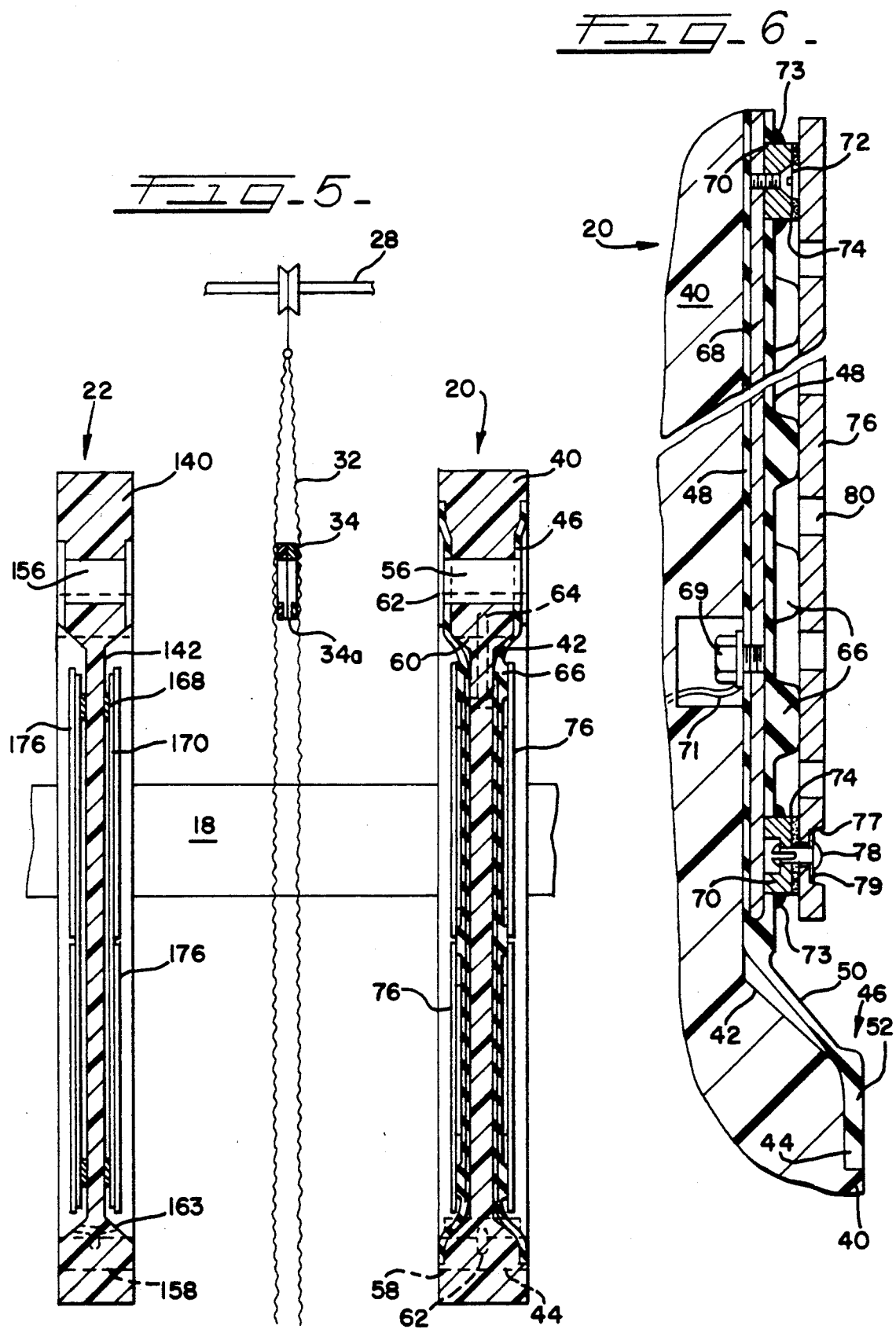

COMPRESSIVE AND ELECTRO-OSMOTIC DEHYDRATOR

FIELD AND BACKGROUND OF THE INVENTION

The present invention relates to a compressive and electro-osmotic dehydrator of the filter press type, wherein liquid containing solids such as sludge or slurry of service water or sewage is dehydrated under pressure, and electro-osmotically to improve the dehydration. Particularly, the invention relates to improvements in the supports for the electrodes and diaphragms of the dehydrator.

Many types of prior art arrangements for electro-osmotic dehydration are described in U.S. Pat. No. 4,376,022 to Porta et al., while electro-osmotic dehydration with a filter press is described in U.S. No. 3,773,640 to Burrage et al.

Compressive and electro-osmotic dehydrators of the filter-press type having press diaphragms are shown in Japanese provisional patent publications No. 62-125810, No. 62-125811 and No. 62-125812 of Shinko Pfaudler Co., Ltd. (now Shinko Pantec Co., Ltd.), all laid open on June 8, 1987.

FIGS. 1a-1c herein show steps of operation of this type of conventional dehydrator, which includes press plates 2a and 2b and a pair of filter cloths 3 between them. The plate 2a has a diaphragm 4 supporting an electrode plate 5a. The other plate 2b has an electrode plate 5b fixed to it.

In the first step shown in FIG. 1a, the press plates 2a and 2b are closed to form a sealed space between them. A liquid containing solids is pumped through passages 6 and squeezed between the cloths 3. An amount of liquid filtrate permeates through the cloths 3 and drains through small holes in the electrodes 5a and 5b and through passages 7. This produces a cake C of sludge and constitutes primary dehydration.

In the second step shown in FIG. 1b, compressed air is supplied to the space between the plate 2a and the diaphragm 4, which swells the diaphragm and compresses the sludge cake C. This further dehydrates the cake down to a water content of 80-85%, and constitutes secondary dehydration.

In a later stage of this step, DC voltage is applied, for example, at 40 volts for 15 minutes between the electrodes 5a and 5b. This causes electro-osmosis to further promote the dehydration, and constitutes tertiary dehydration. As a result, the water content is reduced to about 50% and the cake volume is greatly reduced.

In the last step shown in FIG. 1c, the press plates 2a and 2b are opened and the cloths 3 are lowered in order to remove the finally dehydrated cake C.

The electrodes 5a and 5b, which are expensive, are easily damaged electrochemically, while the electrode 5a is also subjected to strong mechanical actions of the diaphragm 4 which supports it. Conventionally, the electrodes have been made of metal plates, sintered carbon plates or the like.

If the electrode 5a fixed to the diaphragm is a metal plate, it can be constructed advantageously in terms of bending strength, but this is electrochemically disadvantageous.

If the electrode 5a comprises a sintered carbon plate, it must be made of special carbonic material advantageous for electro-osmosis. In general, such material is brittle and does not bend. Consequently, for a large plate size, the electrode of this material must be divided into segments so that it is not broken by high pressure. The provision of divided electrodes on a flexible diaphragm would involve difficulty in uniform voltage application to the electrode segments, complexity in construction for their individual supports and reinforcements, difficulty in providing liquid passages through the electrode segments, and ready exposure to the influences of electrode reaction.

SUMMARY OF THE INVENTION

It is a general object of the invention to provide a compressive and electro-osmotic dehydrator having an improved composite diaphragm construction for supporting divided carbon electrodes.

A dehydrator according to the invention comprises a filter press including a pair of first and second, electrically insulating press plates supported in parallel on a frame and adapted to be moved relative to each other. Each of the press plates has a wide recess, the recesses forming a closed space between the plates when they engage. A pair of filter cloths for enclosing feed liquid are provided between the plates. An electrically insulating diaphragm is fixed at its margin to the first press plate, covers the associated recess, and is adapted to swell outwardly with compressed fluid collected between the diaphragm and the first plate. A metal core plate is embedded within the diaphragm to reinforce it except for its marginal portion, and the core plate is connected to one of the positive and negative poles of an electric DC power source. Electric conductors are fixed in electric connection to the core plate, and project outwardly through the diaphragm. Divided flush carbon electrode plates are fixed in electric connection to the conductors over the diaphragm and core plate. Another electrode plate is supported in the recess of the second press plate in parallel with the divided electrode plates, and connected to the other electric pole.

BRIEF DESCRIPTION OF THE DRAWINGS

A preferred embodiment of the invention is shown in the accompanying drawings, wherein:

FIGS. 1a-1c are schematic cross-sectional views showing steps of operation of a conventional dehydrator;

FIG. 2 is a schematic side view of a dehydrator according to the invention;

FIGS. 3 and 4 are perspective views of an active press plate and a passive press plate, respectively, of this dehydrator;

FIG. 5 is a somewhat enlarged fragmentary view in cross section of this dehydrator, showing adjacent active and passive plates; and FIG. 6 is a greatly enlarged fragmentary view in cross section of the active plate.

DETAILED DESCRIPTION OF THE INVENTION

With reference to FIG. 2, the dehydrator comprises a filter press 12 which includes a front frame 14, a rear frame 16 and a pair of horizontal frames or rails 18 fixed to the front and rear frames. The rails 18 support a front end passive press plate 19 which is fixed to the frame 14, a number of alternating active and passive press plates 20 and 22, a rear end passive press plate 23, and a rear end plate 24. The plates 20, 22, 23 and 24 can be moved on the rails 18 by a drive 26.

The frames 14 and 16 support a horizontal shaft 28 at their tops, which can be rotated by a drive 30 mounted on the rear frame 16. From the shaft 28 are suspended pairs of filter cloths 32 on pulleys 28a, which can be lowered and raised by rotating the shaft 28. Each pair of cloths 32 are interposed between adjacent press plates 19, 20, 22 or 23. The cloths 32 are formed with aligned holes, each surrounded by a washer 34 which has a downwardly facing opening 34a (FIG. 5).

The frames also support a pair of horizontal bus bars 36 connected to the positive and negative poles, respectively, of a DC power source (not shown). One of bars 36 is connected through cables 38 to the active plates 20, and the other bar 36 is connected through other cables 38a to the passive plates 19, 22 and 23.

With reference to FIGS. 3, 5 and 6, each active plate 20 has a generally rectangular frame 40 which may be made of polypropylene or other electrically insulating material. The frame 40 has a wide recess 42 (FIGS. 5 and 6) on each side and a shallower peripheral diaphragm seat 44 around the recess. The recess 42 is covered by a flexible press diaphragm 46 which may be made of natural rubber, neoprene rubber or other electrically insulating flexible material.

The diaphragm 46 has a central portion 48 (FIG. 6), a thin portion 50 of substantially the same width around the center portion and a peripheral margin 52 which is fixed to the seat 44. The margin 52 has grooves 54 (FIG. 3) formed across its outer surface.

The frame 40 has horizontal passages 56, 58 and 60 formed through it adjacent its periphery. The top center slurry passage 56 is aligned with a hole 62 formed through each diaphragm 46. Two of the three drain passages 58 communicate through paths 63 with the diaphragm margin grooves 54. The upper air passage 60 opens through a path 64 out of the frame 40 and upon the inner side of diaphragm 46.

The central diaphragm portion 48 has a large number of outer projections 66 of the same height, and is reinforced by a core plate 68 embedded in it. The core plates 68 on both sides are electrically connected to the associated cable 38 through bolts 69 and wires 71. These plates 68 may be made of iron, titanium, aluminum or other relatively electrically conductive metal.

Each metal plate 68 supports a number of elongated horizontal and vertical, electric conductors 70 (see FIGS. 3 and 6), which are exposed through (or from) the diaphragm 46 and substantially flush with the projections 66. The conductors 70 may be made of stainless steel, copper, aluminum, titanium or carbon.

Each conductor 70 is fixed to the metal plate 68 by a flush head screw 72 (FIG. 6) of stainless steel with electrically conductive adhesive coated between them. The gaps between the conductor 70 and diaphragm 46 are sealed by caulking material 73.

The metal plate 68 is thus surrounded by the insulating anticorrosive material, except where the conductors 70 extend. This completely prevents the plate 68 from corroding with acids or alkalies produced on the electrodes during electrolytic reaction.

The outer surface of conductor 70 is lined with carbonic material 74 secured by an electrically conductive adhesive. This material 74 may be a carbon plate having carbon fibers bound by carbon, a graphite sheet or glassy carbon.

Four divided, generally rectangular electrode plates 76, one of which is shown in FIG. 3, are each formed with a number of peripheral outer recessed seats 77 each having a hole through it. The electrodes 76 are fixed to the conductors 70 by plastic split snaps 78 (see FIG. 6) resiliently snapped through the seats 77 and liners 74 into the conductors 70. The head of each snap 78 is in the recessed seat and does not project from the seat 77.

To the bottom of seat 77 is baked or adhered a thin sheet 79 of polyvinyl chloride or other electrically insulating material in tight contact with the head of snap 78. The sheet 79 insulates the upper surface of the thin bottom wall of electrode seat 77.

The electrodes 76 can be easily removed by cutting the snaps 78 by a snipper or the like. This snapping attachment permits quick replacement of damaged electrodes.

The plastic snaps 78 and insulating sheets 79 do not conduct electricity, and are not dissolved by electrolytic reaction. This prevents electrolytic dissolution of the thin bottom walls of electrode seats 77, and consequently secures the attachment of electrodes 76 to the conductors 70.

Each conductor 70 extends adjacent and in parallel with one of the four sides of each electrode 76. This arrangement reduces the bending forces exerted on the electrodes 76 via the conductors 70, and equalizes the electric application to the electrodes.

The electrodes 76 are supported by the diaphragm projections 66 as well as the conductors 70. Each electrode plate 76 has three right angle corners supported by the wider projections 66 so as not to be broken by the motion of the diaphragm 46. The electrode 76 has a large number of small holes 80 formed through it separated (or apart) from the projections 66 and conductors 70.

With reference to FIGS. 4 and 5, each passive press plate 19, 22, 23 (not shown) has a construction somewhat similar to the active plate 20, but has no diaphragm.

The passive plate has an insulating frame 140 formed with a wide recess 142 on each side corresponding to the active plate recesses 42. The frame 140 has a slurry passage 156, drain passages 158 and an air passage 160 formed through it in respective alignment with the active plate passages 56, 58 and 60. One of drain passages 158 opens into the recesses 142 through paths 163.

To the bottom of each recess 142 of each intermediate passive plate 22 are fixed two horizontal conductors 168, which are connected to the associated electric cable 38a. These conductors 168 support a number of vertical conductors 170 fixed to their outer surfaces by flush screws 172. The outer surfaces of vertical conductors 170 may be lined with carbon material similar to the liners 74 (FIG. 6).

The vertical conductors 170 support four (one shown in FIG. 4) electrode plates 176, which are substantially the same as the electrodes 76 and fixed to the conductors by plastic snaps 178 similarly to the electrodes 76. Each electrode 176 has a number of small holes 180 through it.

Such electrodes and conductors as 176, 168 and 170 are also provided on one side of each end passive plate 19, 23 which faces the adjacent active plate 20.

With reference again to FIG. 2, the front frame 14 is provided with a slurry inlet 82, drain outlets 84 and an air inlet (not shown) in respective alignment with the slurry passages 56 and 156, drain passages 58 and 158 and air passage 160.

In the first step of operation, the drive 26 forces the end plate 24 to compress the press plates 20, 22 and 23 together against the end passive plate 19. This makes the adjacent press plates form sealed filter spaces between the wide recesses 42 and 142 in the same manner as shown in FIG. 1a. Slurry is then pumped through the inlet 82, passages 56 and 156 and washers 34 to collect between and swell the cloths 32 in the sealed spaces. This forces an amount of liquid filtrate from the slurry to permeate through the cloths 32 and drain through the electrode holes 80 and 180, diaphragm corner grooves 54, paths 63 and 163, passages 58 and 158 and outlets 84.

In the second step, compressed air is fed through the passages 60 and 160 and paths 64 to swell the diaphragms 46, compressing the cakes which have resulted from the slurry, in the same manner as shown in FIG. 1b. In a later stage of this step, DC voltage is applied between the electrodes 76 and 176 of adjacent active and passive plates. This forces a further amount of filtrate to drain.

In the final step, the press plates are separated from each other, in the same manner as shown in FIG. 1c, so that the cakes can be removed.

Thus, the present invention enables the diaphragms supporting the electrodes to equally compress the slurry. The divided electrodes individually and equally bear the divided pressures, so that they may not break. This also simplifies, shortens and equalizes the electric routes to the electrodes.

What is claimed is:

1. A compressive and electro-osmotic dehydrator of the filter press type comprising:
    a pair of first and second, electrically insulating press plates supported in parallel on a frame and adapted to be moved relative to each other,
    a recess in each of said press plates for mating with the recess of the other plate to form a closed space for dehydrating feed liquid when the plates engage together,
    an electrically insulating diaphragm fixed at its margin to said first press plate to cover the associated recess, and adapted to expand toward said second plate with compressed fluid contained between said diaphragm and first plate,
    a metal core plate embedded within said diaphragm to reinforce it except for its marginal portion, first electric conductors extending through said diaphragm and connected to said metal core plate and adapted to be connected to one pole of an electric DC power source,
    second electric conductors in electric connection with said metal core plate and projecting through said diaphragm toward said second press plate,
    divided flush carbon electrode plates in electric connection with said second conductors over said diaphragm and said metal core plate, said carbon electrode plates and said metal core plate being substantially coextensive and said metal core plate supporting said carbon electrode plates, and
    another electrode plate supported in the recess of said second press plate in parallel with said divided electrode plates, and connected to the other pole of said power source.

2. A dehydrator according to claim 1, wherein said divided electrode plates are generally rectangular, said diaphragm having projections of different contact areas for supporting said divided electrode plates and forming drain passages behind said divided electrode plates, the projection which support corners of said electrode plates having larger contact areas than the other projections, and said second conductors having substantially the same height as said projections.

3. A dehydrator according to claim 1, and further comprising electrically insulating elastic snaps which fix said divided electrode plates to said conductors.

4. A dehydrator according to claim 3, wherein said divided electrode plates have outer recessed seats through which said snaps snap into said conductors, and in which the heads of said snaps are recessed, the bottom of each of said seats being covered by an electrically insulating sheet.

5. A dehydrator according to claim 1, and further comprising carbon liners attached to the outer surfaces of said conductors in engagement with said divided electrode plates.

6. A dehydrator according to claim 1, wherein said conductors are adhered to said metal core plate by electrically conductive adhesive.

7. A press plate for a compressive and electro-osmotic dehydrator of the filter press type comprising:
    an electrically insulating frame having in its face a recess for registering with the recess in the face of another press plate to form a closed chamber for dehydrating feed liquid when said pates are in abutment;
    an electrically insulating diaphragm fixed at its margin to said frame to cover said recess, and adapted to swell outwardly under the influence of a compressed fluid forced between said diaphragm and frame;
    a metal core plate embedded within said diaphragm to reinforce it except at its margin, and first electric conductors extending through said diaphragm and connected to said initial core plate and connected to one pole of an electric DC power source;
    second electric conductors fixed in electric connection to said metal core plate, and projecting outwardly through said diaphragm; and
    a plurality of divided flush carbon electrode plates fixed in electric connection to said second electric conductors and extending over said diaphragm and said metal core plate and said metal core plate supporting said electrode plates.

* * * * *